(12) United States Patent
Dube

(10) Patent No.: US 11,973,332 B2
(45) Date of Patent: Apr. 30, 2024

(54) BUS BAR WITH COOLING PROTRUSIONS

(71) Applicant: DANA TM4 INC., Boucherville (CA)

(72) Inventor: Francois Dube, Montreal (CA)

(73) Assignee: DANA TM4 INC., Boucherville (CA)

( * ) Notice: Subject to any disclaimer, the term of this patent is extended or adjusted under 35 U.S.C. 154(b) by 786 days.

(21) Appl. No.: 17/055,050

(22) PCT Filed: May 14, 2019

(86) PCT No.: PCT/CA2019/050649
§ 371 (c)(1),
(2) Date: Nov. 12, 2020

(87) PCT Pub. No.: WO2019/218061
PCT Pub. Date: Nov. 21, 2019

(65) Prior Publication Data
US 2021/0218237 A1   Jul. 15, 2021

Related U.S. Application Data

(60) Provisional application No. 62/671,081, filed on May 14, 2018.

(51) Int. Cl.
*H02G 5/10* (2006.01)
*H02G 5/02* (2006.01)

(52) U.S. Cl.
CPC ............... *H02G 5/10* (2013.01); *H02G 5/025* (2013.01)

(58) Field of Classification Search
CPC .......... H02G 5/10; H02G 5/025; H02G 5/002; H02G 5/007; H02B 1/56
See application file for complete search history.

(56) References Cited

U.S. PATENT DOCUMENTS

| 6,574,094 B1 * | 6/2003 | Morrow | F28D 5/00 361/699 |
| 2018/0027693 A1 * | 1/2018 | Greenwood | F28F 13/08 361/690 |

FOREIGN PATENT DOCUMENTS

FR    2762154 A1 * 10/1998 ............... H02G 5/10

OTHER PUBLICATIONS

Machine Translation of FR2762154 provided with Office Action (Year: 1998).*

* cited by examiner

*Primary Examiner* — Roshn K Varghese
(74) *Attorney, Agent, or Firm* — McCoy Russell LLP

(57) ABSTRACT

The present disclosure is concerned with bus bars that are provided with protrusions that allow them to be brought directly or indirectly in contact with a cooling system to remove heat generated in the bus bars themselves. The disclosure further provides a method of cooling a bus bar. The method includes providing at least one bus bar with at least one protrusion, and connecting the at least one protrusion to a cooling element.

18 Claims, 6 Drawing Sheets

BUS BAR WITH COOLING PROTRUSIONS

CROSS-REFERENCE TO RELATED APPLICATIONS

The present application is a U.S. national phase of International Application No. PCT/CA2019/050649, entitled "BUS BAR WITH COOLING PROTRUSIONS", and filed on May 14, 2019. International Application No. PCT/CA2019/050649 claims priority to U.S. Provisional Application No. 62/671,081, entitled "BUS BAR WITH COOLING PROTRUSIONS", and filed May 14, 2018. The entire contents of the above-listed applications are hereby incorporated by reference for all purposes.

FIELD

The present innovation is concerned with bus bars. More specifically, the present innovation is concerned with bus bars provided with protrusions that may be connected with a cooling assembly to thereby cool the bus bar.

BACKGROUND

Bus bars are widely used in electronics to convey signals or more conventionally power from a first location in a circuit or enclosure to a second location. In electric power distribution, a bus bar is a metallic strip or bar for local high current power distribution. Bus bars are also used to connect high voltage equipment at electrical switchyards, and low voltage equipment in battery banks. They are generally non-insulated, and have sufficient stiffness to be supported in air by insulated pillars. These features generally allow sufficient cooling of the conductors, and the ability to tap in at various points without creating a new joint.

Often, multiple bus bars must coexist in close relationships and require electric insulation therebetween. This and other factors may prevent adequate convection cooling of the bus bars.

SUMMARY

In accordance with one aspect of the present disclosure, there is provided a bus bar including a first end, a second end and a conducting path provided between the first and second ends; the conducting path include at least one protrusion so configured and sized as to be connected with a cooling element.

In any of the above, the at least one protrusion may include two or more protrusions evenly spaced along a longitudinal surface of the conducting path.

In any of the above, the at least one protrusion may include two or more protrusions non-evenly spaced along a longitudinal surface of the conducting path.

In any of the above, the at least one protrusion may be of uniform length.

In any of the above, the at least one protrusion may be of non-uniform lengths.

In any of the above, the conducting path may terminate at the first end with a first angled end and may terminate at the second end with a second angled end, wherein the first angled end and the second angled end provide mounting surfaces.

In accordance with another aspect of the present disclosure, there is provided a bus bar assembly including at least one bus bar as disclosed above; and an insulating mounting bracket so configured as to receive at least a portion of the conducting path; the insulating mounting bracket including at least one opening allowing the protrusion therethrough.

Any of the bus bar assembly above may comprise a first bus bar including at least a first protrusion, and a second bus bar including at least a second protrusion, the first protrusion and the second protrusion are aligned such that the first protrusion and the second protrusion are in alternating positions with respect to each other along the a longitudinal direction of the cooling element.

Any of the bus bar assembly above may further comprise at least one compression element configured to maintain the connection between the at least one protrusion and the cooling element.

Any of the bus bar assembly above may further comprise a pressure exertion component configured to exert a force onto the at least one compression element to bias the at least one compression element onto the insulating mounting bracket.

In any of the bus bar assembly above, the insulation mounting bracket may include an intermediate wall; and a plurality of lateral walls; the at least one bus bar is accommodated between the intermediate wall and one of the plurality of lateral walls.

In any of the bus bar assembly above, the intermediate wall may provide a free end defining the at least one compression element.

In any of the bus bar assembly above, the free end may include at least one resiliently flexible projection configured to exert a downward biasing force onto the at least one bus bar, thereby forcing the at least protrusion towards the cooling element.

Any of the bus bar assembly above may further comprise a thermal insulation material configured so that the at least one protrusion is connected to the cooling element via the thermal insulation material.

In any of the bus bar assembly above, the thermal insulation material may be a thermal pad.

In any of the bus bar assembly above, the thermal insulation material may be a thermal pad.

In any of the bus bar assembly above, the cooling element may be an active cooling element.

In any of the bus bar assembly above, the cooling element may be a heat sink.

In any of the bus bar assembly above, the heat sink may be configured as an inverted T-shape.

In a still further aspect, the present disclosure provides a method of cooling a bus bar, the method comprises: providing at least one bus bar with at least one protrusion; and connecting the at least one protrusion to a cooling element.

Any of the method above may further comprise providing an insulating mounting bracket with at least one opening; receiving the at least one bus bar in the insulating mounting bracket; and extending the at least one protrusion through the at least one opening.

Any of the method above may further comprise maintaining the connection between the at least one protrusion and the cooling element.

In any of the above methods, the maintaining may further comprise exerting a force onto a compression element; and transferring the force, by the compression element, onto the at least one bus bar.

In any of the above methods, the maintaining may further comprise providing a free end on an intermediate wall of the insulating mounting bracket, thereby defining the compression element; exerting a downward biasing force, by the free end, onto the at least one bus bar, and forcing the at least one protrusion towards the cooling element.

Any of the method above may further comprise aligning a first bus bar with a first protrusion and a second bus bar with a second protrusion so that the first protrusion and the second protrusion are in alternating positions along a longitudinal direction of the cooling element.

DETAILED DESCRIPTION

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

In the present specification and in the appended claims, various terminology which is directional, geometrical and/or spatial in nature such as "longitudinal", "horizontal", "front", rear", "upwardly", "downwardly", etc. is used. It is to be understood that such terminology is used for ease of description and in a relative sense only and is not to be taken in any way as a limitation upon the scope of the present disclosure.

The expression "connected" should be construed herein and in the appended claims broadly so as to include any cooperative or passive association between mechanical parts or components. For example, such parts may be assembled together by direct connection, or indirectly connected using further parts. The connection can also be remote, using for example a magnetic field or else.

It is to be noted that the expression "Thermal Interface Material" (herein after referred to as "TIM") is to be construed herein and in the appended claims as any type of material that is thermally conductive and electrically insulating.

Other objects, advantages and features of the bus bar with cooling protrusions will become more apparent upon reading of the following non-restrictive description of illustrative embodiments thereof, given by way of example only with reference to the accompanying drawings.

Generally stated, illustrative embodiments of the bus bars described herein are provided with protrusion that allow them to be brought directly or indirectly in contact with a cooling system to remove heat generated in the bus bars themselves.

Figure 1:
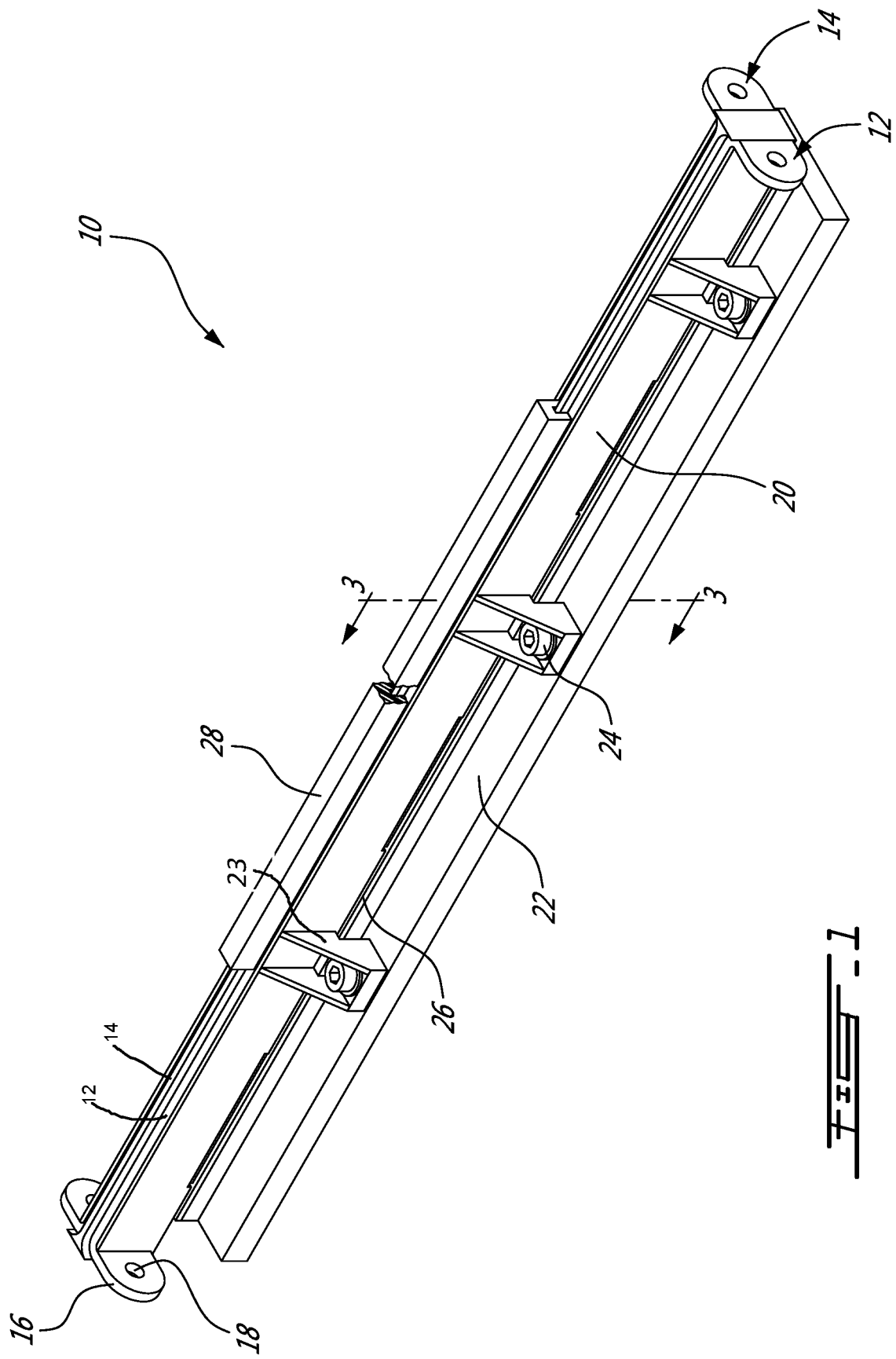
FIG. 1 is a perspective view of a bus bar assembly according to a first illustrative embodiment.
Figure 2:
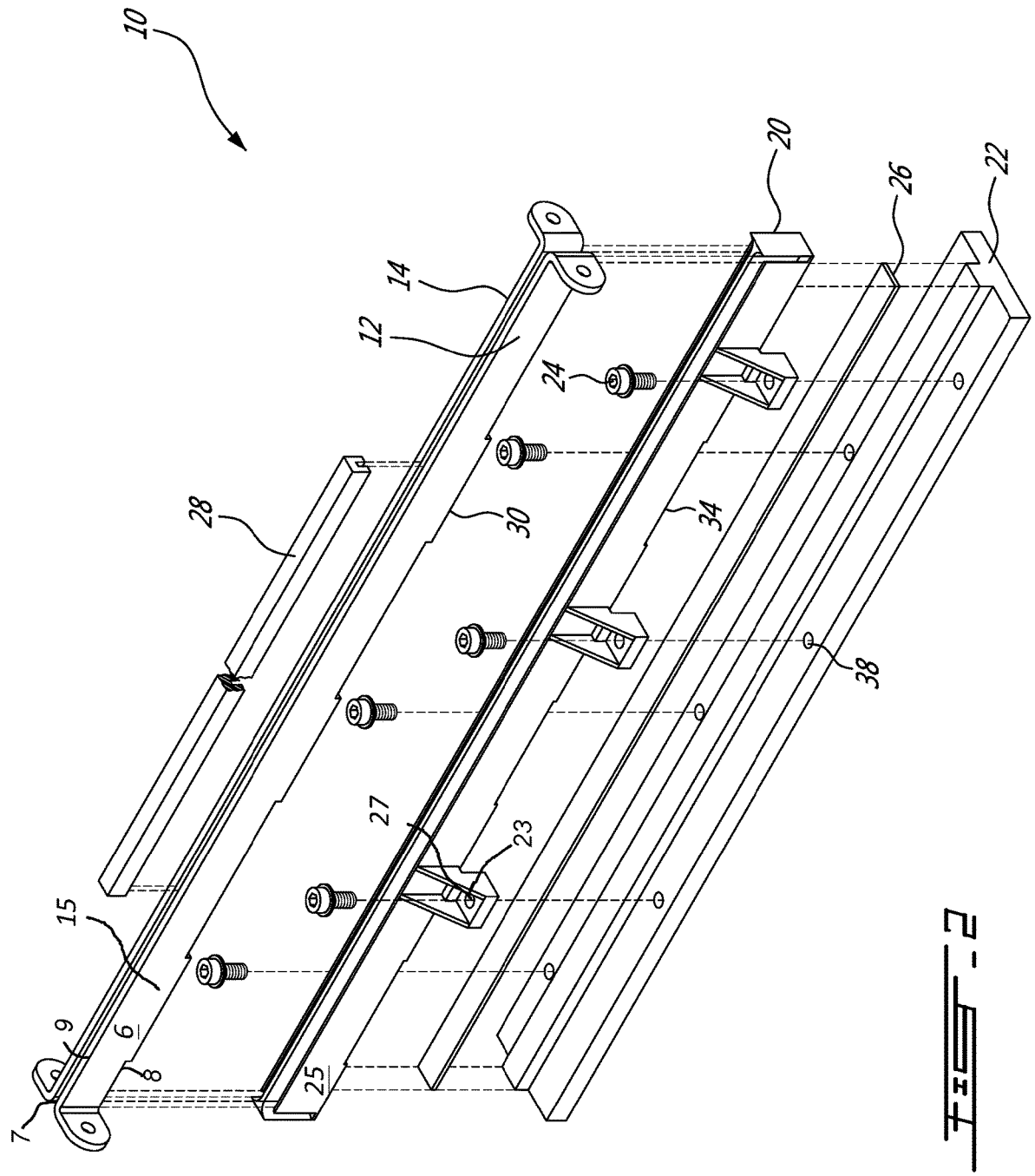
FIG. 2 is an exploded perspective view of the bus bar assembly of FIG. 1 see from the topside.

FIGS. 1 and 2 of the appended drawings illustrates a bus bar assembly 10 according to an illustrative embodiment. The assembly 10 includes first and second bus bars 12 and 14 that are generally straight and provided with angled ends 16 provided with connection apertures 18. Each of the first and second bus bars 12 and 14 includes a conductive path provided by a generally straight conductive body 15 (FIG. 2) that terminates at opposite ends with angled ends 16. In the illustrated embodiment, the conductive body 15 of each bus bar 12, 14 is an elongate, rectangular member that includes first and second broad, planar surfaces 6, 7 and first and second side edges 8, 9. In the illustrated example, the conductive bodies 15 of each bus bar are located parallel to each other with their second planar surfaces 7 in spaced apart opposition to each other and their first planar surfaces 6 facing in opposite, outward directions. The angled ends 16 of each bus bar 12, 14 extend perpendicularly relative to first broad surface 6 (FIG. 2) of the body 15. As to be appreciated by those skilled in the art, the angled ends 16 may extend from the body 15 at any suitable angle so as to accommodate any surface to which the bus bars 12 and 14 are to be mounted.

The bus bars 12 and 14 are received in an insulating mounting bracket 20 that includes separate slots for each bus bar 12, 14. The insulating mounting bracket 20 is mounted to a heat sink 22 via fasteners 24. In the illustrated embodiment, the fasteners 24 are accommodated in connection brackets 23, which project from a first broad surface 25 of the insulating mounting bracket 20. Fasteners 24 are received through connection apertures 27 of the connection brackets 23. It is to be appreciated that any other suitable method of connection between the insulating mounting bracket 20 and heat sink 22 is contemplated. A TIM 26 is provided between the bus bars 12 and 14 and the heat sink 22 to allow heat therethrough but to insulate the bus bars from the heat sink. In the illustrated embodiment, TIM 26 takes the form of an elongate pad. will be apparent to one skilled in the art, the heat sink 22, which is itself a cooling element, can be mounted to an active cooling system (not shown), for example a liquid flowing cooling system.

The bus bar assembly 10 also includes a generally U-shaped compression element 28 used to compress the bus bars 12 and 14 onto the TIM 26 such that the bus bars thermally engage the heat sink 22.

Figure 4:
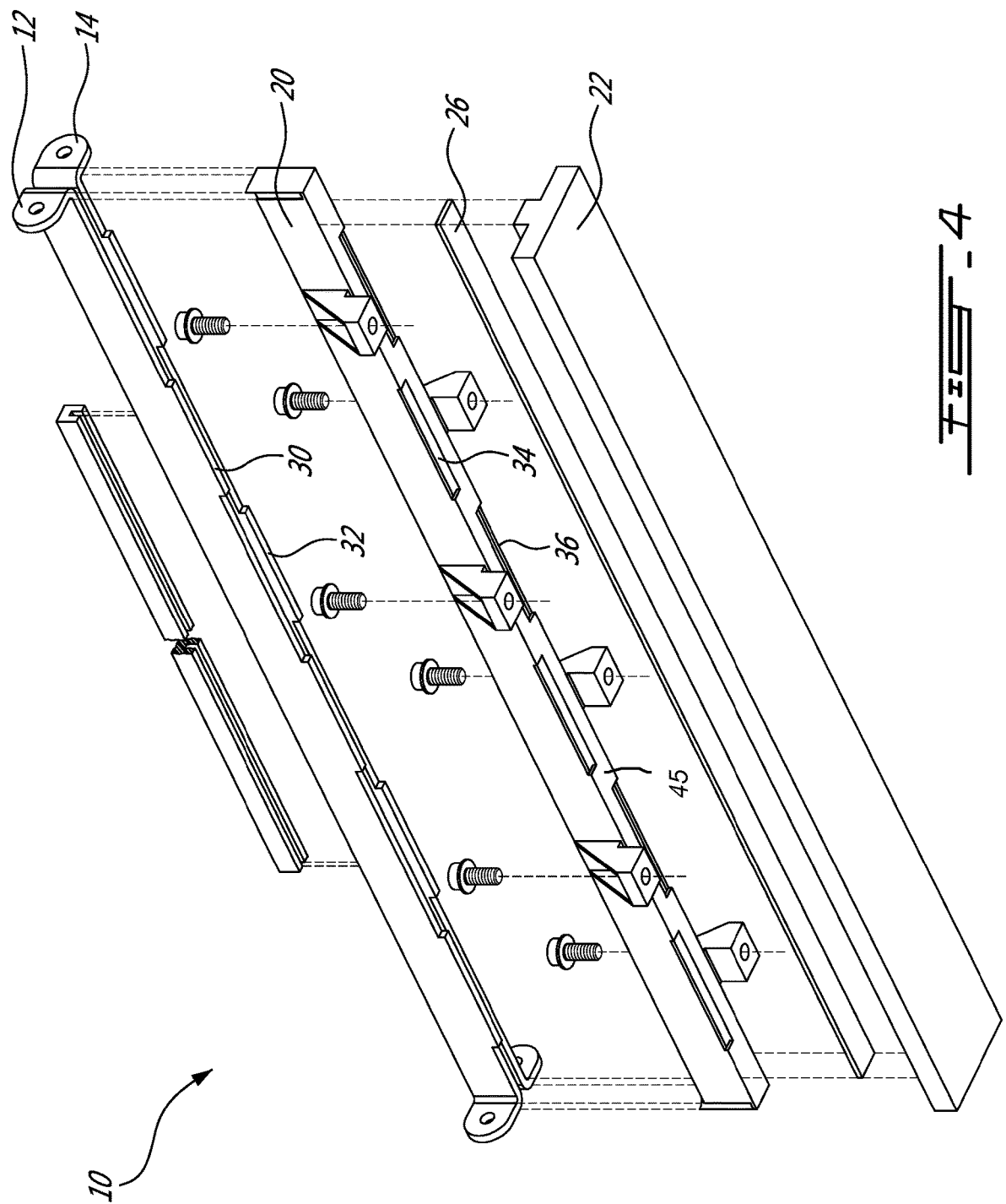
FIG. 4 is an exploded view of the bus bar assembly of FIG. 1 shown from the underside.

FIGS. 2 and 4 of the appended drawings illustrate the bus bar assembly 10 in an exploded view. As can be seen from this figure, the bus bars 12 and 14 include protrusions 30 and 32, respectively, (only protrusion 30 shown in FIG. 2) that extend from the first edge 8 of each bus bar 12, 14. The protrusions 30 and 32 are configured as to protrude through respective apertures 34 and 36 (only apertures 34 shown in FIG. 2) provided in the insulating mounting bracket 20.

As can also be seen from FIG. 2, in the illustrated example described herein, the heat sink 22 is generally T-shaped and provided with threaded apertures 38 configured to receive the fasteners 24. One skilled in the art will understand that the inverted T-shape of the heat sink 22 increases the creepage distance between the bus bars 12, 14 and the heat sink 22.

Figure 3:
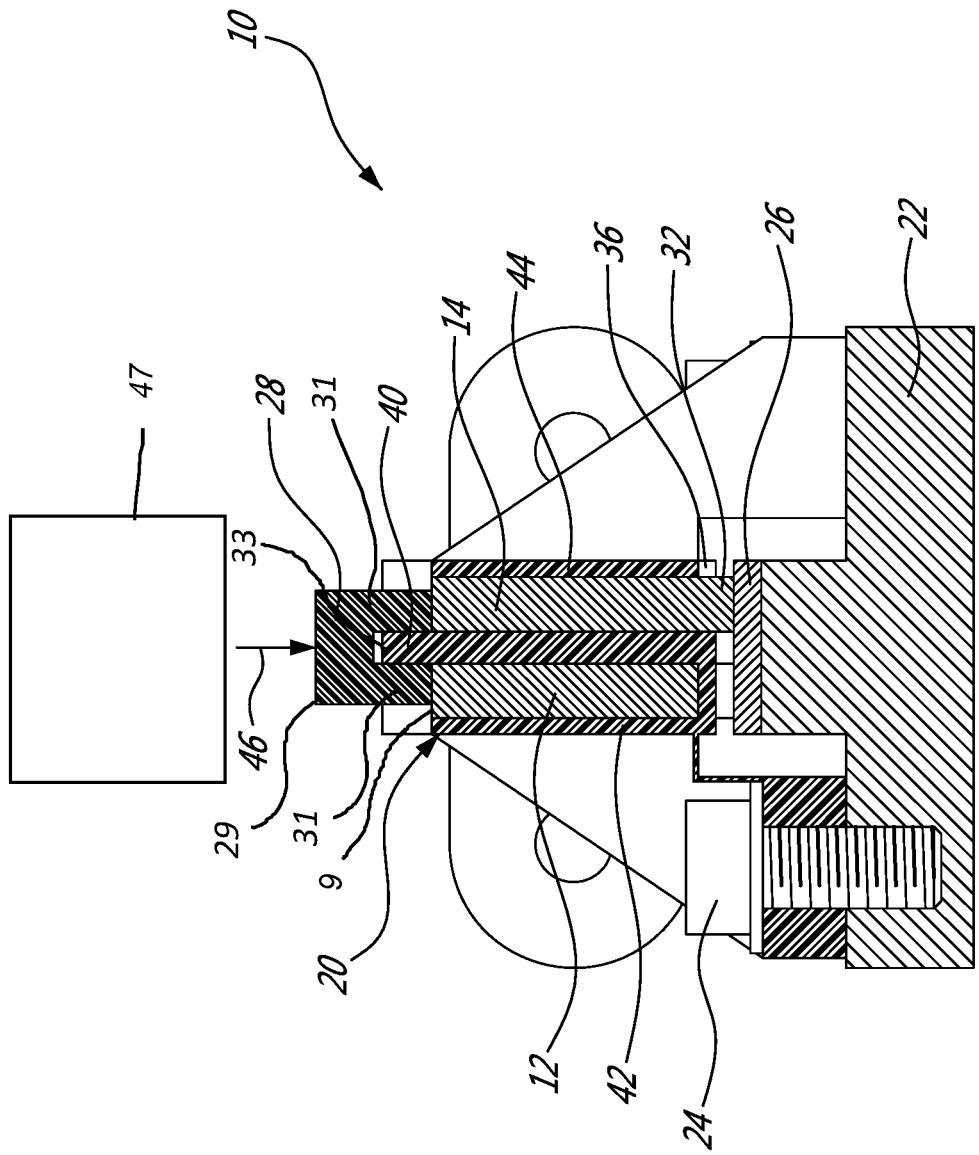
FIG. 3 is a sectional view taken along line 3-3 of FIG. 1.

FIG. 3 of the appended drawings is a sectional view taken along line 3-3 of FIG. 1 and shows the contact between a protrusion 32 of the bus bar 14, extending through the aperture 36, and the TIM 26. This FIG. 3 also illustrates an intermediate wall 40 of the insulating mounting bracket 20 separating the two bus bars 12 and 14. FIG. 3 illustrates outer lateral walls 42 and 44 of the insulating mounting bracket 20. Outer walls 42, 44 and intermediate wall 40 each extend approximately parallel to each other, with the slot for bus bar 12 being formed between outer wall 42 and intermediate wall 40, and the slot for bus bar 14 being formed between outer wall 44 and intermediate wall 40. AS best seen in FIG. 4, outer walls 42, 44 and intermediate wall 40 are all connected along a bottom edge thereof to a bottom wall 45 of the . The apertures 34 and 36 are formed through the bottom wall 45 of the insulating mounting bracket 20

While not seen in the appended figures, the bus bar assembly 10 also, in some example embodiments, includes means (see FIG. 3) in the form of a pressure exertion component 47 to apply pressure onto the compression element 28 (see arrow 46) to provide an adequate contact between the protrusions 30 and 32 of the bus bars 12 and 14 and the thermal pad 26. For example, clips biasing the compression element 28 onto the insulating mounting bracket 20 could be used. In the embodiment shown in FIGS. 1 to 5, the compression element includes a U-shaped body 29 with two side members 31 defining a slot 33 that is configured to fittingly receive at least a top portion of the intermediate wall 40. When compression element 28 is positioned over the intermediate wall 40, each of the two side members 31 are configured to be in contact with a top surface of side edge 9 of each of the bus bars 12 and 14 as best shown in FIG. 3, thus maintaining the bus bars 12 and 14 within the insulating mounting bracket 20 to maintain contact between the protrusions 30, 32 with the thermal pad 26.

FIG. 4 illustrates the protrusion 30, 32 of the bus bars 12 and 14 and the corresponding apertures 34, 36 of the insulating mounting bracket 20 in an exploded view.

As shown, the protrusions 30 and 32 are generally of similar length and evenly spaced on the bottom side edge 8 of each of bus bars 12 and 14, respectively. It is to be understood that the dimensions of protrusions 30, 32 may be non-uniform. In some embodiments, the length of protrusions 30 from bus bar 12 may differ from that of protrusion 32 from bus bar 14. In some further embodiments, the protrusion on a single bus bar, such as protrusions 30 on bus bar 12, may be of varying length. The thickness of the protrusions 30 and 32 may vary based on the thickness of bus bars 12 and 14 upon which they are formed. As it may be appreciated by the skilled person, longer and/or wider protrusions may possess more contact surface area with the cooling element thereby improve thermal conductivity of the individual protrusion. One or more dimensions of the protrusions 30 and 32 may be dependent upon factors such as thermal conduction rates along the conductive body 15, the heat dissipation capabilities of the corresponding sections of the heat sink 22, or any other suitable consideration.

As best shown in FIG. 4, the protrusions 30 of bus bar 12 and the protrusions 32 of bus bar 14 are generally evenly spaced apart on their respective bus bars 12, 14. Further, the bus bars 12 and 14 are received by the insulating mounting bracket 20 so as to align the protrusions 30 and 32 in alternating positions along the length of the heat sink 22. Correspondingly, apertures 34, 36 of the insulating mounting bracket 20 are configured in a similar manner. It is to be understood that the protrusions on a single bus bar, such as protrusions 30 on bus bar 12 may be non-evenly spaced. Furthermore it is to be understood any other suitable alignment of protrusions 30 and 32 may be possible, including at least partially overlap.

Figure 5:
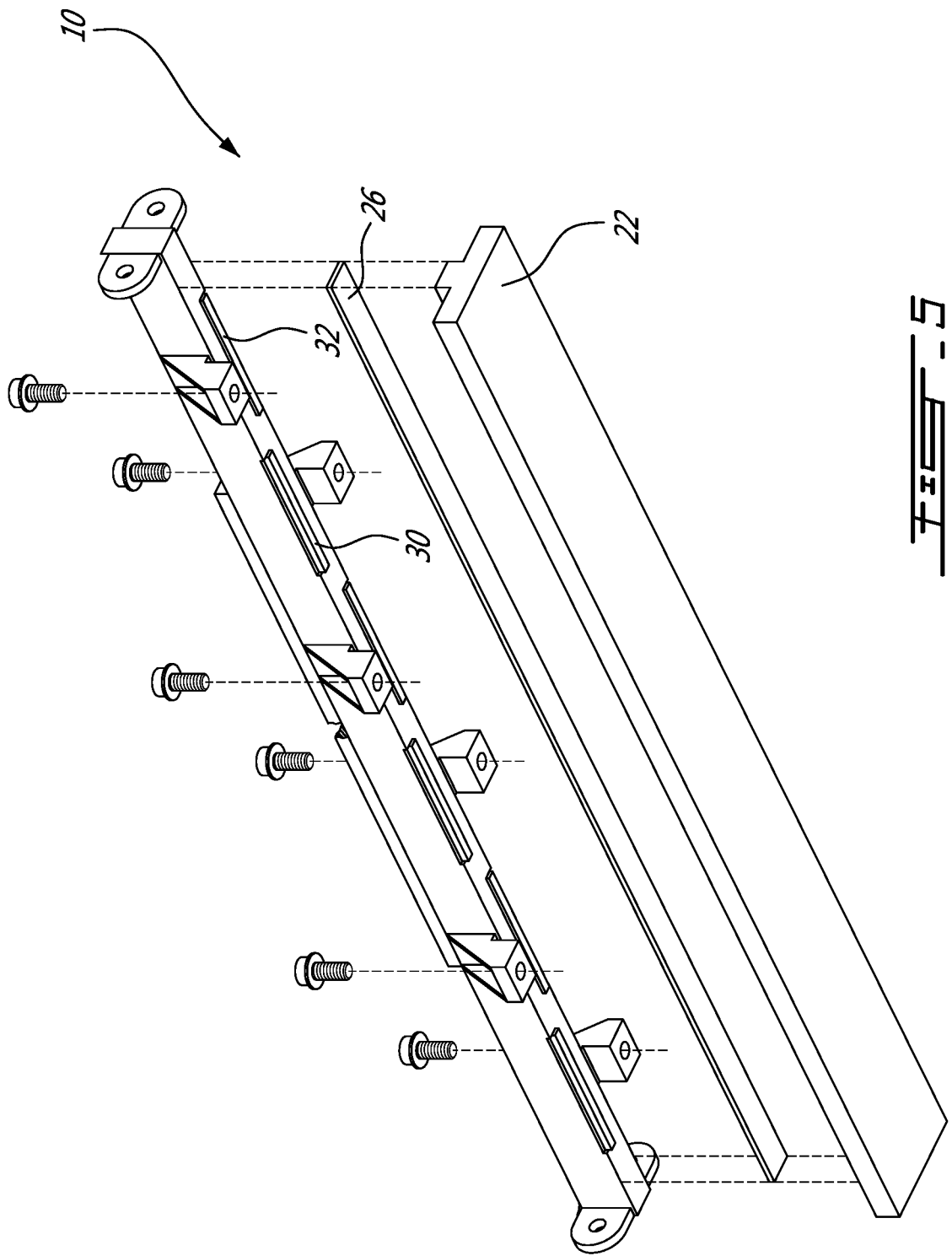
FIG. 5 is a partially exploded view of the bus bar assembly of FIG. 1 shown from the underside.

FIG. 5, which is similar to FIG. 4 but illustrates the bus bar assembly 10 in a partially exploded view, shows the protrusions 30, 32 extending through the apertures 34 and 36.

Accordingly, as will easily be understood by one skilled in the art, the heat generated in the bus bars 12 and 14 will be transferred to the heat sink 22, via the thermal pad 26, since an adequate contact is established therebetween and maintained.

Figure 6:
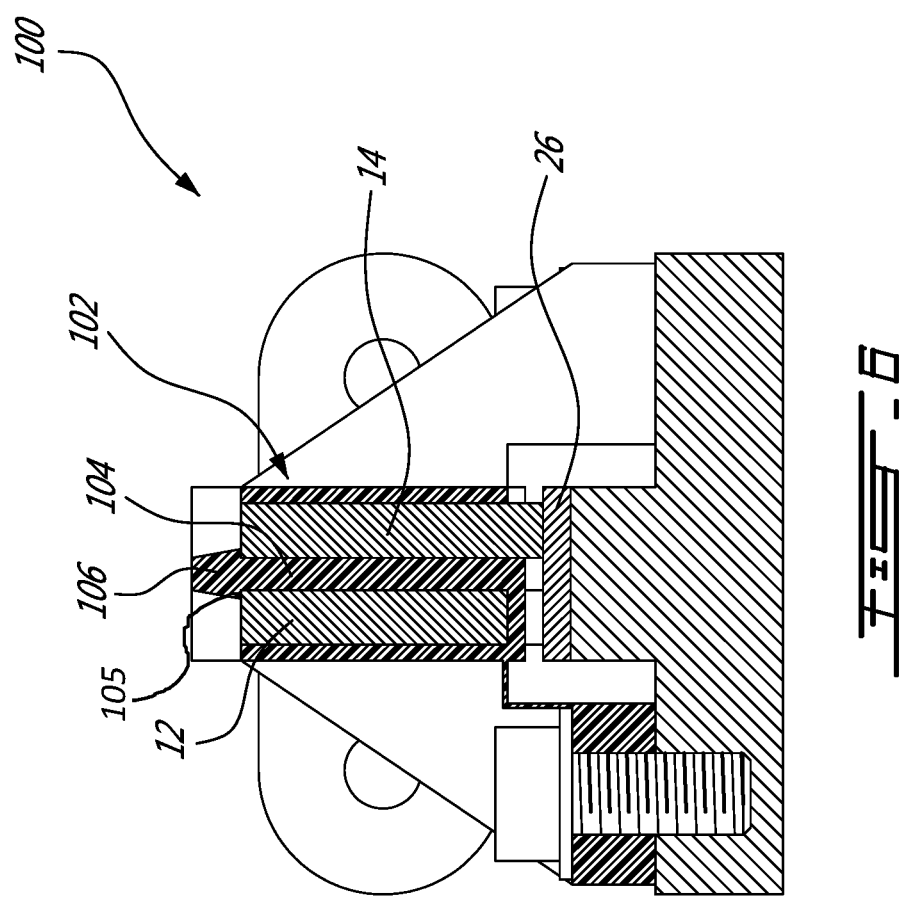
FIG. 6 is a sectional view similar to FIG. 3 but showing a second illustrative embodiment.

Turning now to FIG. 6 of the appended drawings, which is a sectional view similar to FIG. 3, a bus bar assembly 100 according to a second illustrative embodiment will be described.

The bus bar assembly 100 is very similar to the bus bar assembly 10 and therefore only the difference therebetween will be described hereinbelow.

Generally stated, a major difference between the assembly 100 and the assembly 10 is the feature used to maintain the contact between the protrusions and the thermal pad.

Indeed, the insulating mounting bracket 102 has a slightly taller intermediate wall 104 provided with a generally arrow-shaped free end 106 so configured and sized as to hook both bus bars 12 and 14 when they are inserted in the bracket 102 and maintain them in connection with the thermal pad 26. In other words, the free end 106 defines the compression element. Specifically, the arrow-shaped free end 106 a head portion with two side projections 105 that extend beyond the footprint of the intermediate wall 40. The side projections 105 are configured to extend over at least a portion of the bus bars 12 and 14 as shown in FIG. 6. In other exemplary embodiments, side projections 105 may be configured to resiliently flexible and configured with a slight downward angle. When bus bars 12 and 14 are placed within the insulating mounting bracket 20, the projections 105 of free end 106 resiliently bend upwardly so as to accommodate the bus bars, while exerting a downwardly biasing force onto the bus bars 12 and 14 thereby maintaining the connection between the protrusions 30 and 32 with the TIM and/or the heat sink. Although a generally arrow-shaped free end 106 is disclosed, it is to be understood that other suitably shaped free end 106 may be used to maintain the connection between protrusions 30, 32 with the TIM and/or heat sink.

One skilled in the art will understand that other methods or elements could be used to compress these elements such that heat is adequately extracted from the bus bar.

While the above description and the appended drawings illustrate two bus bars running parallel, one skilled in the art will understand that the number of bus bars could be different and that their configuration could be different than parallel.

One skilled in the art will also understand that while the bus bars illustrated herein include protrusion on their entire length, these protrusions could be present only on portion of the bus bars, for example on portions of a bus bar that is to be placed in the proximity of the cooling assembly.

The size and shape of the protrusions can be designed depending on the configuration of the circuit where the bus bar is to be used.

Also, while the bus bars are shown herein as being insulated from one another by a bracket made of dielectric material, the protrusions allowing the bus bars to be connected to a cooling assembly would also be interesting on bus bar that are not mounted in insulating mounting brackets.

One skilled in the art will understand that the intermediary T-shaped heat sink 22 could be omitted should the topology of the bus bar and of the cooling system be such that it is possible to directly mount the protrusions of the bus bars, via a TIM, to a cooling system.

It is to be understood that the bus bar with cooling protrusions is not limited in its application to the details of construction and parts illustrated in the accompanying drawings and described hereinabove. The Bus bar with cooling protrusions is capable of other embodiments and of being practiced in various ways. It is also to be understood that the phraseology or terminology used herein is for the purpose of description and not limitation. Hence, although the Bus bar with cooling protrusions has been described hereinabove by way of illustrative embodiments thereof, it can be modified, without departing from the spirit, scope and nature thereof. As used herein terms like approximately, generally, and substantially mean within plus/minus 15% of the property they are used in conjunction with.

What is claimed is:

1. A bus bar, including a first end, a second end and a conducting path provided between the first and second ends, the conducting path including at least one protrusion so configured and sized as to be connected with a cooling element, wherein the conducting path terminates at the first end with a first angled end and terminates at the second end with a second angled end,
wherein the first angled end and the second angled end provide mounting surfaces.

2. The bus bar as recited in claim 1, wherein the at least one protrusion includes two or more protrusions evenly spaced along a longitudinal surface of the conducting path.

3. The bus bar as recited in claim 1, wherein the at least one protrusion includes two or more protrusions non-evenly spaced along a longitudinal surface of the conducting path.

4. The bus bar as recited in claim 1, wherein the at least one protrusion comprises two or more protrusions of uniform length.

5. The bus bar as recited in claim 1, wherein the at least one protrusion comprises two or more protrusions of non-uniform lengths.

6. A bus bar assembly, including:
a cooling element;
a first bus bar having a conducting path including at least a first protrusion extending from an edge thereof and thermally engaging the cooling element; and
an insulating mounting bracket so configured as to receive at least a portion of the conducting path, the insulating mounting bracket including at least one opening allowing the first protrusion therethrough.

7. The bus bar assembly as recited in claim 6, comprising:
a second bus bar having a conducting path including at least a second protrusion extending from an edge thereof and thermally engaging the cooling element, the insulating mounting bracket being configured as to receive at least a portion of the conducting path of the second bus bar; the insulating mounting bracket including at least one further opening allowing the second protrusion therethrough.

8. The bus bar of claim 7, wherein the first protrusion and the second protrusion are aligned such that the first protrusion and the second protrusion are in alternating positions with respect to each other along a longitudinal direction of the cooling element.

9. The bus bar assembly as recited in claim 6, further comprising at least one compression element configured to maintain thermal engagement between at least the first protrusion and the cooling element and a pressure exertion component configured to exert a force onto the at least one compression element to bias the at least one compression element onto the insulating mounting bracket.

10. The bus bar assembly as recited in claim 9, wherein the insulating mounting bracket includes:
an intermediate wall; and
a plurality of lateral walls,
wherein the first bus bar is accommodated between the intermediate wall and one of the plurality of lateral walls.

11. The bus bar assembly as recited in claim 10, wherein the intermediate wall provides a free end defining the at least one compression element, the free end including at least one resiliently flexible projection configured to exert a downward biasing force onto the first bus bar, thereby forcing at least the first protrusion towards the cooling element.

12. The bus bar assembly as recited in claim 6, further comprising a thermal insulation material configured so that at least the first protrusion thermally engages the cooling element via the thermal insulation material, wherein the thermal insulation material is a thermal pad.

13. The bus bar assembly as recited in claim 6, wherein the cooling element is an active cooling element.

14. The bus bar assembly as recited in claim 6, wherein the cooling element is a heat sink configured as an inverted T-shape.

15. A method of cooling a bus bar, the method comprising:
providing at least one bus bar with at least one protrusion;
connecting the at least one protrusion to a cooling element;
providing an insulating mounting bracket with at least one opening;
receiving the at least one bus bar in the insulating mounting bracket; and
extending the at least one protrusion through the at least one opening.

16. The method of claim 15, further comprising maintaining the connection between the at least one protrusion and the cooling element by:
exerting a force onto a compression element; and
transferring the force, by the compression element, onto the at least one bus bar.

17. The method of claim 16, further comprising maintaining the connection between the at least one protrusion and the cooling element by:
providing a free end on an intermediate wall of the insulating mounting bracket, thereby defining the compression element;
exerting a downward biasing force, by the free end, onto the at least one bus bar; and
forcing the at least one protrusion towards the cooling element.

18. The method of claim 15, wherein the at least one bus bar comprises a first bus bar with a first protrusion and a second bus bar with a second protrusion, and wherein the first protrusion and the second protrusion are in alternating positions along a longitudinal direction of the cooling element.

* * * * *